United States Patent [19]
Tsenter

[11] Patent Number: 5,746,064
[45] Date of Patent: May 5, 1998

[54] ELECTROCHEMICAL HEAT EXCHANGER

[75] Inventor: Boris Tsenter, Norcross, Ga.

[73] Assignee: Borst, Inc., Norcross, Ga.

[21] Appl. No.: 892,693

[22] Filed: Jul. 15, 1997

Related U.S. Application Data

[62] Division of Ser. No. 586,369, Jan. 16, 1996.

[51] Int. Cl.$^6$ .............................. F25B 17/08; F28D 15/00
[52] U.S. Cl. ..................... 62/480; 165/104.12; 429/59; 429/87; 429/156; 429/192
[58] Field of Search ........................... 429/120, 59, 82, 429/87, 156, 192, 218; 62/480; 165/104.12

[56] References Cited

U.S. PATENT DOCUMENTS

| | | |
|---|---|---|
| 4,009,423 | 2/1977 | Wilson . |
| 4,488,592 | 12/1984 | Mittal et al. . |
| 4,523,635 | 6/1985 | Nishizaki et al. . |
| 4,583,583 | 4/1986 | Wittel . |
| 4,593,534 | 6/1986 | Bloomfield . |
| 4,671,080 | 6/1987 | Gross . |
| 4,829,785 | 5/1989 | Hersey . |
| 4,976,117 | 12/1990 | Crozat et al. . |
| 5,024,060 | 6/1991 | Trusch . |
| 5,063,747 | 11/1991 | Jones et al. . |
| 5,122,338 | 6/1992 | Wallace et al. . |
| 5,143,799 | 9/1992 | Tsenter . |
| 5,187,025 | 2/1993 | Kelland et al. . |
| 5,290,640 | 3/1994 | Tsenter et al. . |
| 5,316,869 | 5/1994 | Perry, Jr. et al. . |
| 5,317,805 | 6/1994 | Hoopman et al. . |
| 5,405,533 | 4/1995 | Hazlebeck et al. . |
| 5,411,077 | 5/1995 | Tousignant . |
| 5,418,079 | 5/1995 | Diethelm . |
| 5,419,156 | 5/1995 | Sywulka . |
| 5,423,498 | 6/1995 | Fluegel . |
| 5,429,183 | 7/1995 | Hisamori et al. . |
| 5,441,102 | 8/1995 | Burward-Hoy . |
| 5,445,217 | 8/1995 | Castaing et al. . |

*Primary Examiner*—John S. Maples
*Attorney, Agent, or Firm*—Reed Smith Shaw & McClay LLP

[57] ABSTRACT

An electrochemical heat exchanger including a housing, at least one electrochemical cell within the housing with a first electrode and a hydrogen electrode at least partially immersed in a liquid electrolyte, and positive and negative terminals of the electrochemical cell connected through the housing to respective positive and negative ends of a power supply. The housing includes a gas space which is in communication with a heat exchange chamber. The heat exchange chamber can be a flexible chamber capable of expanding in response to an increase in pressure in the electrochemical cell and contracting in response to a decrease in pressure in the electrochemical cell or it can be a conduit whereby an element to be cooled is placed in thermal contact with either hydrogen gas or a liquid coolant. The hydrogen gas or liquid coolant exchanges heat with the element to be cooled and is constantly replenished by cooler hydrogen or liquid coolant forced through the heat exchanger by a pressure differential created in the electrochemical cell.

6 Claims, 6 Drawing Sheets

ELECTROCHEMICAL HEAT EXCHANGER

This application is a division of application Ser. No. 08/586,369, filed on Jan. 16, 1996, the contents of which are hereby incorporated by reference.

BACKGROUND OF THE INVENTION

This invention relates to a heat exchange system, and particularly to an electrochemical heat pump system.

DESCRIPTION OF THE RELATED ART

Cooling of electronic devices utilizing a vapor compression refrigeration cycle is known in the art. Vapor compression cooling uses the thermodynamic principles associated with phase transfer, specifically the latent heat of vaporization and the entropy of evaporation of a working fluid. Compression of a vaporous working fluid can occur through mechanical or electrochemical means. Mechanical compression requires a relatively large, heavy, mechanical compressor having a great number of parts which are often bulky and susceptible to wear.

After compression, the heated working fluid is condensed and gives up its latent heat of vaporization to a low temperature reservoir often referred to as a heat sink. The liquified working fluid is then expanded at constant enthalpy. The cool liquified working fluid can be used to exchange heat with a hot element by giving up its latent heat of vaporization. This cycle is known as a Joule-Thomson refrigeration cycle. Electrochemical compressors have been proposed to drive Joule-Thomson refrigeration cycles. See, for example, U.S. Pat. No. 4,593,534 and U.S. Pat. No. 4,829,785, both of which are hereby incorporated by reference in their entireties herein. This type of compressor is preferred since it has no moving parts, is vibration fee, and has the potential for long life and reliability. However, heat pumps or heat exchange devices which incorporate these types of compressors suffer from a number of disadvantages. Electrochemical compressors as described in the art require an electrolyte formed from a solid ion exchange membrane because in the course of condensing the working fluid substantial pressure gradients are created in the heat exchanger. They also require a number of external devices such as heat sinks to condense the hot pressurized vapor, and Joule-Thomson expansion valves to expand and cool the working fluid because of the low temperature requirements of the refrigerator or cryogenic cooling system. In fact, it is often necessary to precool the compressed hydrogen gas below its inversion temperature (160K). Another disadvantage associated with these types of systems is that they are not capable of replenishing the hydrogen gas that is lost through leakage to the environment. Furthermore, phase transfer cooling systems require specific positioning of a radiator and lack control over regulating the rate of heat exchange.

As described in U.S. Pat. No. 4,523,635, which is hereby expressly incorporated by reference in its entirety herein, it is known that certain metals and alloys exothermically occlude hydrogen to form a metal hydride and the metal hydride reversibly releases hydrogen. Such a heat pump can be constructed by providing a first metal hydride ($M_1H$) and a second metal hydride ($M_2H$) which have different equilibrium dissociation pressures at the same temperature, in closed receptacles capable of effecting heat exchange with a heat medium, and connecting these receptacles with a common gas space conduit so as to permit transfer of hydrogen therebetween. However, these type of heat exchange devices rely on differences in equilibrium dissociation pressures of the respective metal hydrides. The metal hydrides utilized must be able to occlude and release hydrogen at very substantial rates, and metal hydrides of this type are very expensive to manufacture and utilize. Additionally, it is difficult to efficiently control the production and consumption of hydrogen during operation of the heat exchanger using principles of disassociation of hydrogen from metal hydrides.

Hydrogen is well known as having excellent thermoconductive properties and is often used for cooling electrical machines like electrical generators and transformers and is also used as a cooling agent in refrigeration units. However, gas production during operation of an electrochemical cell is considered undesirable and has motivated numerous design modifications to electrochemical cells used in the battery art. This is due to the fact that production of gases such as hydrogen and oxygen during charge and discharge of an electrochemical cell causes pressure and temperature build-ups in the cell which are adverse to a closed system.

In sealed electrochemical cells, the gases produced are recombined back into water inside the sealed battery cell. Sealed electrochemical cells share some fundamental principles. First, they attempt to minimize hydrogen evolution by using an excess of discharged negative material and rely on the oxygen cycle to maintain discharged negative material in the cell at all times. Second, they are generally limited to individual vessel designs, that is, individual cells each hermetically sealed to ensure that all oxygen generated in a particular cell will recombine in the same cell. Third, starved electrolyte is used to permit oxygen transport to the negative electrode. Finally, in multiple cell batteries, close matching of cell capacities, charge efficiencies, and temperatures is required to guarantee long life and avoid cell reversal, hydrogen evolution, overpressure, and overheating.

U.S. Pat. No. 5,143,799, which is hereby expressly incorporated herein by reference in its entirety addresses some of these problems. It discloses a sealed rechargeable nickel zinc or silver zinc cell divided into two compartments, one compartment having a zinc electrode and a first hydrogen electrode and a second compartment having a nickel or silver electrode and a second hydrogen electrode electrically connected to the first hydrogen electrode. A common gas space is provided for the two compartments so that the hydrogen and oxygen gases can recombine to form water.

Another approach to the problem associated with gas production in a sealed electrochemical cell is U.S. Pat. No. 5,290,640, which is hereby expressly incorporated herein by reference in its entirety. This patent teaches a sealed storage battery containing one or more working cells capable of generating gas with a pressure sensor mounted to detect and adjust pressure inside the sealed container by utilizing a pressure regulator.

In the electrochemical batteries, the focus is on eliminating the excess hydrogen and oxygen that is involved during charge, discharge, and overcharge, or on a means to vent the excess gas. The electrochemical heat exchanger of the present invention is not a battery and utilizes hydrogen produced to cool a heated element. The electrochemical cells of the present invention consume energy, but do not produce energy. In electrochemical batteries, little emphasis is placed on the positive consequences associated with controlled hydrogen production and consumption in an electrochemical cell.

There exists a need in the art to provide hydrogen gas in a controlled manner, and to use the hydrogen produced as a coolant or means to drive a liquid coolant pump.

There also exists a need in the art for a continuously supply of hydrogen gas to effectuate more efficient heat transfer between hydrogen and a heat source.

SUMMARY OF THE INVENTION

In accordance with the present invention, there is provided an electrochemical heat exchanger which contains one or more electrochemical cells which produce and consume hydrogen gas in a common gas space within a closed receptacle or sealed chamber, the gas being capable of effecting heat exchange with an element to be temperature regulated. Preferably, the electrochemical heat exchanger is comprised of a plurality of electrochemical cells sharing a common gas space. Each cell containing either gas reversible electrodes only or a combination of solid reversible electrodes and gas reversible electrodes. Hydrogen electrodes are commonly used as the gas electrode. The solid electrodes can be reversible metal electrodes like Fe, Cd, Zn, Pb, metal hydride electrodes like $AB_2$ or $AB_5$ metal hydride alloys or metal-oxide electrodes like $NiOOH_2$, $MnO_2$, $PbO_2$, AgO. In some cases it is possible to use only hydrogen electrodes. The hydrogen electrodes are capable of both generating and consuming hydrogen.

The solid electrodes of the present invention are unable to occlude or consume substantial amounts of hydrogen. In the preferred embodiment of the present invention, the cells are symmetrical and/or the Open Circuit Voltage ("OCV") across the cells is near or equal to 0. The electrodes are divided by means of a porous separator. This separator prevents electrical contact between electrodes in addition to providing electrolytic conductivity.

Applications of the presently disclosed heat exchanger include cooling electrical machines or devices such as electrical generators and transformers, and the refrigeration art wherein metal hydrides having different dissociation constants are used to transfer hydrogen between cells. By way of example only U.S. Pat. Nos. 4,523,635 and 5,445,217, both of which are hereby expressly incorporated by reference herein in their entireties are provided as possible applications of the present invention.

Hydrogen as discussed herein is very useful as a cooling agent. Hydrogen has a thermoconductivity value seventeen times that of air. However, hydrogen does have some limitations when compared to liquid cooling agents. For example, hydrogen has a low magnitude of specific capacity which may make it less appealing for larger volume applications. For larger volume applications it may be more energy efficient to use hydrogen as a pump for a liquid cooling agent.

It is an object of the present invention to utilize hydrogen produced during charging of a cell to regulate the temperature of an element to be temperature regulated such as a microchip. When using the hydrogen gas produced as a cooling agent it is preferable to "move" and replenish the gas so that it transfers heat absorbed to the environment and maintains an ambient temperature. Therefore, it is an object of the present invention to use the hydrogen produced to create a pressure differential between electrochemical cells.

It is an object of the present invention to cool elements with hydrogen without utilizing extreme pressure differentials.

It is an object of the present invention to provide a means of compensating for hydrogen loss during leakage.

It is an object of the present invention to cool elements without relying on phase transfer thermodynamics.

It is an object of the present invention to utilize a liquid, and to use electrodes immersed in a liquid electrolyte to produce, pump, and consume a heat exchange gas.

It is an object of the present invention to provide a sealed electrochemical heat exchanger that is durable, reliable, and easily monitored.

It is an object of the present invention to provide a manageable heat exchange which regulates the rate of heat exchange by controlling electrical parameters such as current polarity and intensity.

It is a further object of the present invention to avoid excess production of hydrogen.

It is a further object of the present invention to utilize the hydrogen produced in an electrochemical cell to pump a liquid cooling agent in order to place the liquid in thermal contact with a body, element or device to be cooled due to hydrogen's low value of specific heat in comparison to most liquids.

The objects discussed above are satisfied by the electrochemical heat exchanger disclosed herein.

In the preferred embodiment, the electrochemical heat exchanger of the present invention provides a first electrochemical cell having a first electrode and a first hydrogen electrode, the first electrode and hydrogen electrode being partially immersed in a first liquid electrolyte. The first electrochemical cell forms a first gas space. The heat exchanger also includes a second electrochemical cell, a second electrode and a second hydrogen electrode, the second electrode and second hydrogen electrode being partially immersed in a second liquid electrolyte. In the second electrochemical cell there exists a second gas space.

The heat exchanger also includes a heat exchanger chamber disposed between the first and second cells with the first and second gas spaces being in communication through the heat exchange chamber. It is only necessary for the heat exchange chamber to be in heat transfer relationship with the element to be temperature regulated, thus, the heat exchanger chamber is capable of accommodating an element to be cooled either inside the heat exchange chamber or on a surface area that is in thermal contact with the heat exchange chamber.

The first hydrogen electrode is electrically connected to the second hydrogen electrode and the first metal hydride electrode is connected to a pole of a power supply. The second metal hydride electrode being connected to a second pole of the power supply. A pressure differential is established between the two cells through production of hydrogen by applying a positive polarity to the metal hydride electrode of one cell and consuming hydrogen by applying a negative polarity to the metal hydride electrode of the other cell.

The power supply can be a reverse-polarity power supply capable of switching the direction of current applied which reverses the function of the respective cells. The poles of the power supply are switched if a voltage difference across the metal-hydrogen cells is within the range of about 100 mV to 600 mV. The power supply may be a battery or a rectifier or any other electric source capable of delivering direct current.

The first and second electrode is preferably selected from the group consisting of metal, metal-hydride, and metal oxide, and further selected from the group consisting of Cd, Zn, Fe and Pb if they are metal, and selected from the group consisting of NiOOH, MnOOH, AgO, and PbO if they are metal oxides. It should be noted that hydrogen produced in the first cell is consumed in the second cell at a rate substantially equal to the rate that hydrogen is being produced in the first cell. The rate of hydrogen production and consumption is controlled by regulating current direction and intensity supplied by the power supply.

It is an important feature of the present invention that a mechanical pump is not necessary. This is due to the pressure differential established in the respective electrochemical cells. The cooperating producing and consuming cells afford a continuous flow of hydrogen gas though the conduit.

If the hydrogen source is a metal hydride-hydrogen electrochemical cell, then the hydrogen consumer in the adjacent cell is generally the same type of metal hydride-hydrogen cell, only having the opposite polarity. For example, if a lanthium nickel-hydrogen cell is used as the producer then the second electrochemical cell, the consuming cell, will also be a lanthium nickel-hydrogen cell with the opposite polarity. It is preferred that the metal hydride-hydrogen cell operating as a hydrogen generator and the metal hydride-hydrogen cell operating as the hydrogen consumer have different polarities.

The electrochemical heat exchanger of the present invention is different from conventional galvanic cells in that the cells preferably have an overall or summary OCV near 0. The electrochemical heat exchanger is preferably made of a pressure resistant material divided into two compartments. An example of material used to house the electrochemical cells is a polymeric material, preferably a polyamide.

The electrochemical heat exchanger can operate, for example, using any suitable metal hydride-hydrogen couple. Metal hydride electrode may be comprised of an $AB_2$ or $AB_5$ type alloy. The $AB_2$ alloy can be, for example, $MmNi_{3.5}Co_{0.8}Mn_{0.4}Al_{0.3}$ where Mm is a mish metal comprised mainly of La, Ce, Pr and Nd. The $AB_2$ can be generally selected from the type disclosed in U.S. Pat. No. 4,728,586 which is hereby expressly incorporated by reference herein in its entirety and a specific example of an $AB_2$ type alloy is $V_{33}Ti_{13}Zr_{14}Ni_{33}Cr_7$. The hydrogen electrodes provide reversible consumption and generation of hydrogen and are of the same design used in nickel-hydrogen cell or fuel cell technology disclosed in U.S. Pat. No. 5,290,640. The metal hydride-hydrogen cell operates as follows: Hydrogen generation and consumption occurs as per reaction.

On the hydrogen electrode:

(1)

On the metal-hydride electrode:

(2)

Summary reaction:

(3)

Reaction from left to right is associated with hydrogen production and reaction from right to left is associated with hydrogen consumption.

The coolant liquid flow or hydrogen flow depends upon the applied current value established between the two electrochemical cells. Liquid or hydrogen thermal contact with a heated element (for example a microchip) removes heat from the heated element and transfers heat to a heat sink. The heated element is normally located external to the heat exchanger, and the heat is transferred through a metal or thermally conductive material which comprises the heat exchange chamber. The type of heat sink is not important and can be made of any material known in the art.

A key feature to the present invention is that it does not rely on phase transfer thermodynamics, but rather on constant flow of a gas or liquid that is at an ambient temperature and which can absorb the heat and quickly transport it to the consuming cell by means of an electrochemical pump to exchange the heat absorbed with a heat sink. The present invention provides an opportunity for rapid delivery of heat absorbed to the heat sink. This allows the utilization of a wide selection of possible heat sinks. The heat sink can be constructed as any type of radiator without concern about internal heat transfer or flow resistance.

The moving force for hydrogen transfer is provided as a result of the difference in hydrogen pressure between the producing and consuming cells. As stated above, the rate of heat being removed is dependent upon the rate of hydrogen flow and, therefore, the applied current. The voltage value on the cell (V) depends upon an open circuit voltage ("OCV") and the impedance of the internal cell. The OCV value metal-hydride hydrogen cells by inverse connections is equal to zero. The cell voltage is the product of the cell impedance and current. This product is usually no more than about 100 mV for a metal-hydride-hydrogen cell, and the maximum voltage value for metal-hydride-hydrogen cell is about 600 mV. The maximum voltage value of 600 mV is for both consuming and producing cells. The relationship between current (I) and hydrogen flow (F) is directly correlated to the pressure differential in the cell as defined by Faraday's Law:

$$F=0.11 \times I \ ml/sec \quad (4)$$

The required power value W for providing hydrogen flow, F, is:

$$W=V \times F/0.11 \quad (5)$$

where V is expressed in volts, and W in watts. In this case the hydrogen is produced in one metal hydride-hydrogen cell and passes through the gas conduit to allow thermal contact with the device to be cooled and is consumed in another cell. Alternatively, the hydrogen produced in one cell forces a liquid cooling agent through the pipe to allow thermal exchange between the element to be cooled and the liquid cooling agent. In this case, the force resulting from hydrogen gas production meets little resistance due to the fact that an equal or substantially equal amount of hydrogen is being consumed in the consuming cell.

It is possible to use a plurality of metal hydride-hydrogen cells electrically connected in a series. In this case the hydrogen flow, F, would be equal to:

$$F=0.11 \times n \times I \ ml/sec \quad (6)$$

with n being the total number of cells.

Additionally, should the capacity of the solid electrode in the consuming cell be depleted, it will result in a sudden increase, or jump, of the potential of the hydrogen electrode. The reaction of oxygen adsorption on the hydrogen electrode is responsible for this sudden jump. This occurs via the following reason:

(7)

The overall voltage jump can be used beneficially as an indicator for switching polarity. During operation, the voltage drop across the cell is continuously monitored to determine the necessity of switching polarity. Switching polarity changes hydrogen flow direction and modes of the respective cell operation. In this case, the hydrogen-consuming cell operates as hydrogen-producing cell and vice versa.

The objects and advantages of the present invention will be apparent from the attached drawings and the disclosure of the preferred embodiments that follow.

BRIEF DESCRIPTION OF THE DRAWINGS

The invention is herein described, by way of example only, with reference to the accompanying drawing, wherein.

DETAILED DESCRIPTION OF THE PREFERRED EMBODIMENTS

The principles and workings of an electrochemical heat exchanger according to the present invention can be better understood with reference to the drawing and the accompanying detailed description which describes possible embodiments of the electrochemical heat exchanger according to the present invention.

Figure 1:
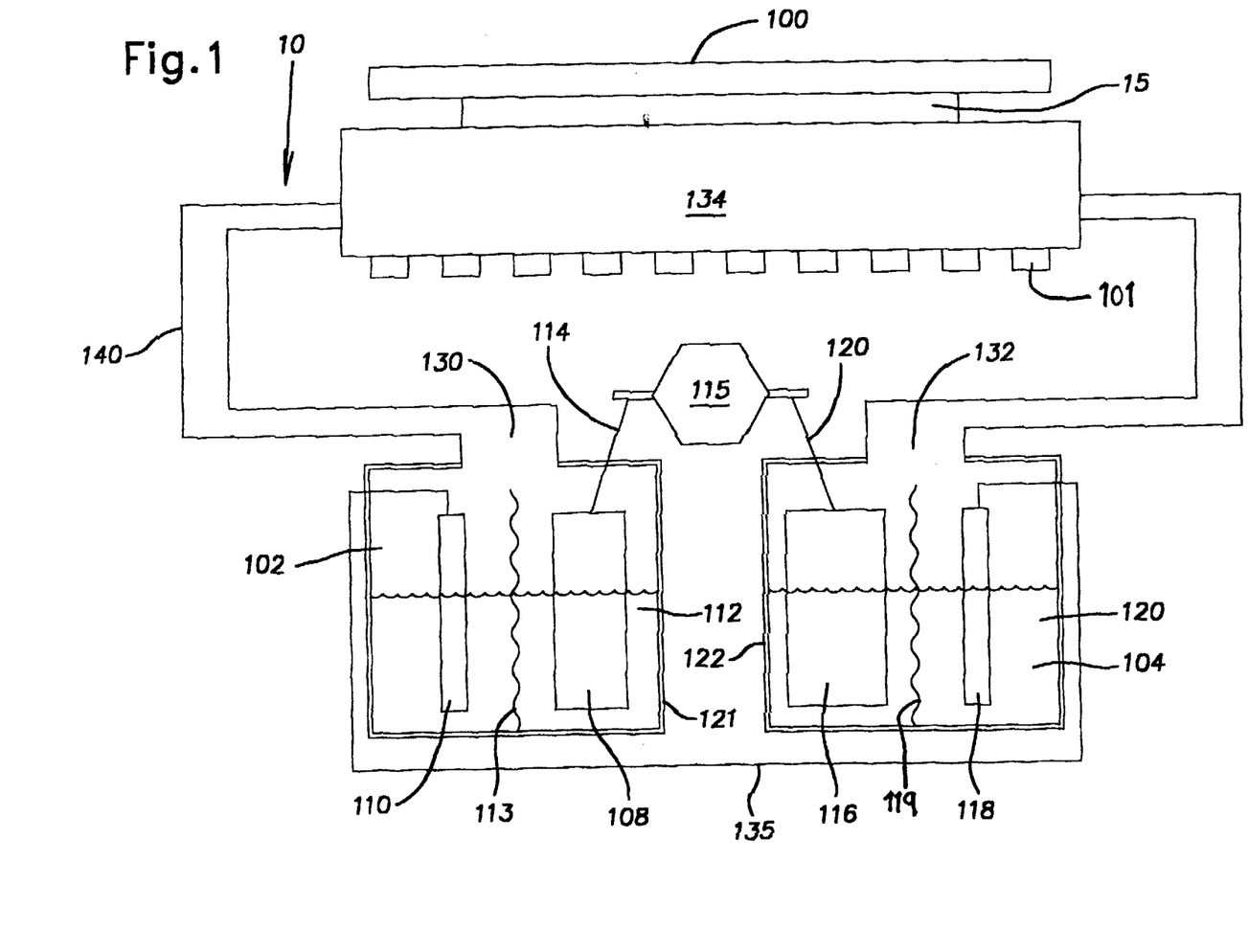
FIG. 1 is a schematic illustration of a preferred embodiment of an electrochemical heat exchanger according to the present invention.

Referring now to the drawings, FIG. 1 is a schematic depiction of an electrochemical heat exchanger 10 according to the present invention. Electrochemical heat exchanger 10 is divided into two cells 102, 104. The first electrochemical cell 102 is a metal hydride-hydrogen cell while the other electrochemical cell 104 is a second metal hydride-hydrogen cell. Each of cells 102, 104, are enclosed in housing 121, 122 which completely seals the cells 102, 104 and prevents contact with the atmosphere. The first electrochemical cell 102 includes a metal hydride electrode 108 and a first hydrogen electrode 110 at least partially immersed in a first electrolyte 112 in metal hydride-hydrogen cell 102. Metal hydride electrode 108 and first hydrogen electrode 110 are separated by a first separator 113 constructed preferably of non-woven polypropylene. First electrolyte 112 only partially fills metal hydride-hydrogen cell 102 leaving a first gas space 130 above first electrolyte 112. Metal hydride electrode 108 is electrically connected to an electrode lead 114 which serves to connect electrode 108 to an external voltage source or power supply 115 which can be used to charge or discharge the metal hydride electrode 108.

Second metal hydride-hydrogen cell 104 includes a metal hydride electrode 116 and a second hydrogen electrode 118 both of which are at least partially immersed in a second electrolyte 120. Second electrolyte 120 near metal hydride electrode 116 is separated from second hydrogen electrode 118 by a second separator 119. Second electrolyte 120 is kept completely separate from the first electrolyte since cell 102 and cell 104 are separate compartments. Second electrolyte 120 only partially fills metal hydride-hydrogen cell 104 leaving a second gas space 132 above second electrolyte 120. First gas space 130 and second gas space 132 are in fluid communication through conduit 140 allowing hydrogen gas from the respective electrochemical cells 102, 104 to pass back and forth through intermediate gas space or heat exchange chamber 134. In effect, first gas space 130, second gas space 132, and intermediate gas space 134 form a single common gas space.

It should be noted that in the preferred embodiment, electrodes 108 and 116 are metal hydrides; however, electrodes 108, 116 can also be metal or metal oxides which stimulate the production and consumption of hydrogen.

For simplicity of presentation, FIG. 1 and the description above and below depicts the various electrodes as being immersed in pools of liquid electrolytes. It should be kept in mind that in practice, only small amounts of electrolytes are used, making contact only with the small pores of the electrodes and the separators. Thus, in a practical system, only a small portion of the compartments would be occupied with electrolytes while most of the rest of the space would constitute the gas space.

Any suitable electrolyte may be used as first or second electrolyte 112, 120 in the two cells 102, 104. Potassium is the electrolyte of choice for metal hydride-hydrogen cells, metal-hydrogen cells (Cd, Zn, Fe as metal), and metal oxide-hydrogen cells (i.e., NiooH, MnooH, AgO as metal oxides). However, if Pb or PbO is used as the metal or metal oxide electrodes 108, 116, then it is preferable to use aqueous sulfuric acid electrolyte. If the electrolyte used is aqueous potassium hydroxide, it is preferably made up of a mixture of from about 5 to about 40% potassium alkaline, more preferably about 30% potassium hydroxide, and from about 0.5 to about 2.5% lithium alkaline, preferably about 2.5% lithium alkaline.

The separators 113, 119 in the two cells can be made of any suitable material. Preferably, the separators 113, 119 are celgar, cellophane, non-woven polypropylene, an ion-exchange membrane, or asbestos. Preferably the separators 113, 119 are non-woven polypropylene for metal hydride-hydrogen cells and an ion-exchange membrane separator for hydrogen-hydrogen cells.

Metal hydride electrode 108 of first cell 102 is electrically connected to metal hydride electrode lead 114 which serves to connect metal hydride electrode 108 to external voltage source 115. First hydrogen electrode 110 is electrically connected to second hydrogen electrode 118 of second cell 104 through hydrogen electrode lead 135. Cells 102 and 104 are thus electrically connected to each other in series.

The hydrogen electrodes 110, 118 preferably have a thickness of about 0.2 mm and are preferably made by pressing a mixture of about 75% carbon, about 5% acetylene soot, about 15% PTFE and about 0.1% Pt. The function of the PTFE is two-fold. It is simultaneously a binding component and a hydrophobic element. The carbon is primarily structural but also serves as an electrical conductor. The acetylene soot is added to improve the electrical conductivity. Platinum serves as a catalyst for both the generating and consuming processes. The metal hydride electrodes 108, 116 preferably have a thickness of about 2.0 mm and are preferably pressed. A metal hydride electrode can be made by, for example, pressing La, Ni, Co, or Al and activating by charging-discharging cycles. They can be of the $AB_2$ or $AB_5$ type.

The advantages achieved by using an electrochemical heat exchanger 10 according to the present invention can be appreciated with reference to the various reactions which take place during the electrochemical heat exchanger operation.

During operation, first electrochemical cell 102 is in charge mode, and the electrochemical cell 104 is in discharge mode. According to the present invention the following reactions take place in the respective metal hydride-hydrogen cells 102, 104:

At the metal hydride electrode:

$$MeH + e^- + OH^- \Longleftrightarrow Me + H_2O \qquad (8)$$

At the hydrogen electrode of the metal hydride-hydrogen cell:

$$H_2O \Longleftrightarrow 1/2\, H_2 + OH^- + e^- \qquad (9)$$

The summary reaction of the nickel-hydrogen cell during discharge is obtained by adding equations (7) and (8):

$$MeH \Longleftrightarrow Me + 1/2\, H_2 \qquad (10)$$

During charging, all reactions go in the opposite direction so that the amount of hydrogen produced is no greater than that consumed. The overall summary reaction of the entire two-compartment electrochemical heat exchanger illustrates that no overall hydrogen is produced.

An element 100 to be cooled is placed on a surface area 15 of the heat exchange chamber 134. Heat exchange chamber 134 is adapted to be disposed in heat exchange relationship with the element 100 to be temperature regulated. The surface area 15 is in thermal contact with the hydrogen being exchanged between the electrochemical cells. A hydrogen pressure differential is established between the first electrochemical cell 102 which produces hydrogen during the charge cycle; and the second electrochemical cell 104 which consumes hydrogen during discharge cycles. This pressure differential establishes an electrochemical pump which allows the hydrogen produced in electrochemical cell 102 to pass through chamber 134 and be consumed in electrochemical cell 104. As the hydrogen passes through chamber 134, it exchanges heat with the element 100 to be cooled. This effectively allows an element or item 100 to be cooled. It is important to note that there is no phase change involved, rather the heat transfer fluid, i.e. hydrogen, absorbs the heat, rapidly moves to the consuming cell, and dissipates the heat absorbed to a heat sink(s) 101 which may be located either on the heat exchange chamber or be located on the consuming cell.

It is also noted that during overcharge, oxygen is evolved at the metal hydride electrode which causes a voltage jump. The overall voltage jump can advantageously be used as an indicator of the end of charging and the need to change the direction of the current. During charging the voltage drop across the electrochemical heat exchanger 10 is continuously monitored, and upon a noticeable voltage jump, charging should be stopped, and the polarity changed.

Figure 2:
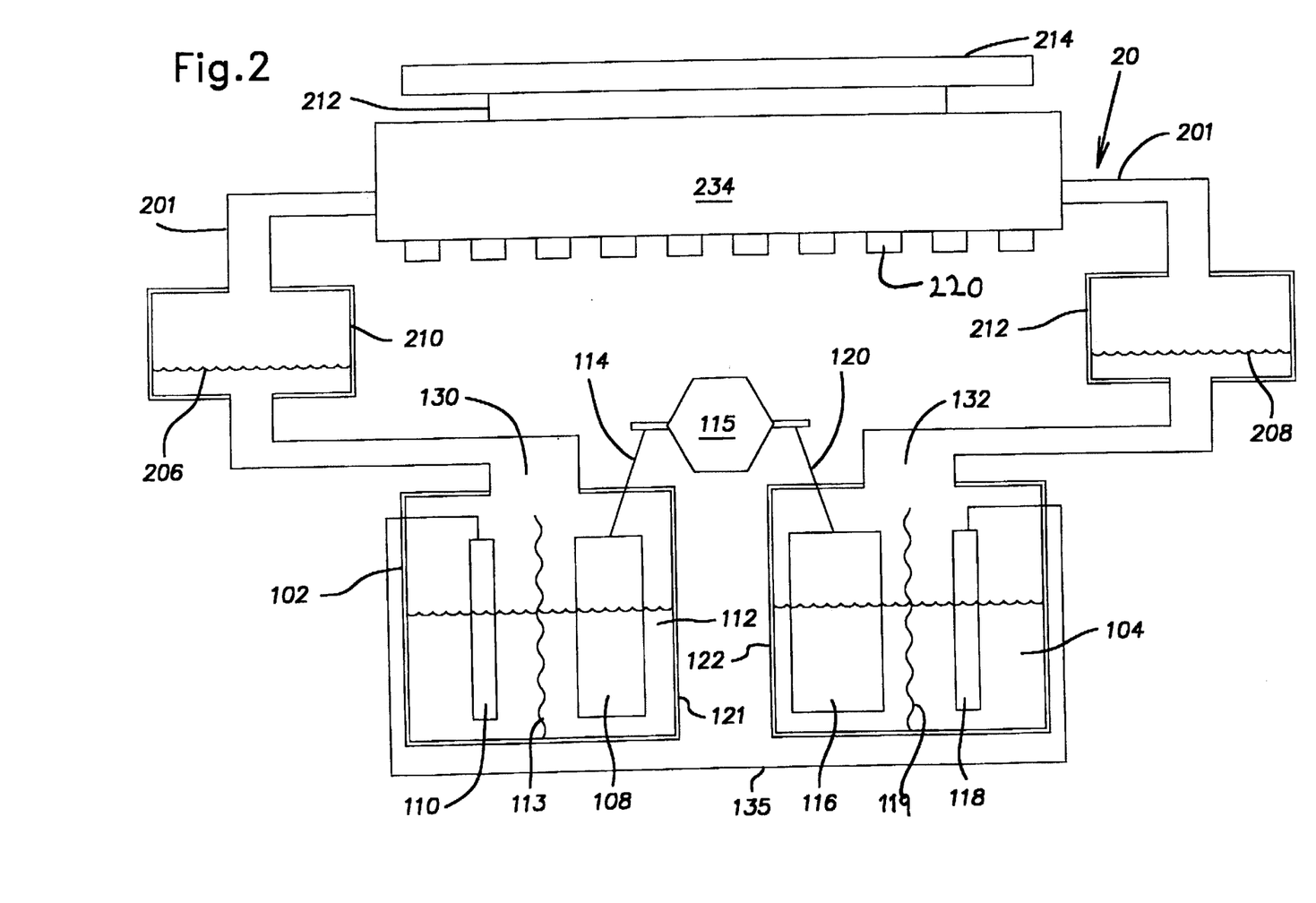
FIG. 2 is a schematic depiction of another embodiment of the present invention, wherein a fluid filled coolant may be used.

In FIG. 2, an alternative embodiment of the present invention is illustrated. Numerals similar to those in FIG. 1 represent elements the same as those in FIG. 1. The electrochemical heat exchanger 20 differs from that described above in that the conduit 201 contains a liquid coolant such as water as the heat transfer fluid or another suitable heat exchange gas. Water has specific heat capacity equal to 4.217 kJ kg$^{-1}$ K$^{-1}$, 300 times that of hydrogen (14.2 kJ kg$^{-1}$ K$^{-1}$). The liquid coolant is in contact with the respective electrochemical cells 202, 204 as indicated by liquid coolant level lines 206, 208. The electrochemical cells 202, and 204 are essentially identical to those described with regard to the preferred embodiment and the discussion relating to each element of the electrochemical cells 102, 104 apply equally to this embodiment. The liquid coolant level 206, 208 moves in response to the pressure differential established between the cells 102, 104. Liquid coolant levels 206, 208 indicate that the liquid contained in the conduit 201 is capable of being pushed back and forth through heat exchange chamber 234 and exchanges the heat present in the element 214 to be cooled through thermally conductive heat exchange plate 212. The heated liquid transports the heat absorbed and exchanges it with a heat sink 220 that may be located on either or both sides of the heat exchange chamber 234. It is also possible to incorporate a level sensor (not shown) to determine liquid position. This would permit the direction or intensity of the current to be regulated in response to the liquid coolant position. In this embodiment, it is necessary to switch the polarity of the two cells 102, 104 in order to change the flow direction of the liquid coolant. The liquid coolant present in the conduit can be located below the gas spaces 130, 134 or be separated from gas spaces 130, 134 by a flexible membrane, for example. It is also possible to exchange the liquid electrolyte between the electrochemical cells 202, 204. For simplicity, these alternatives are indicated by liquid coolant levels 206, 208.

Figure 3:
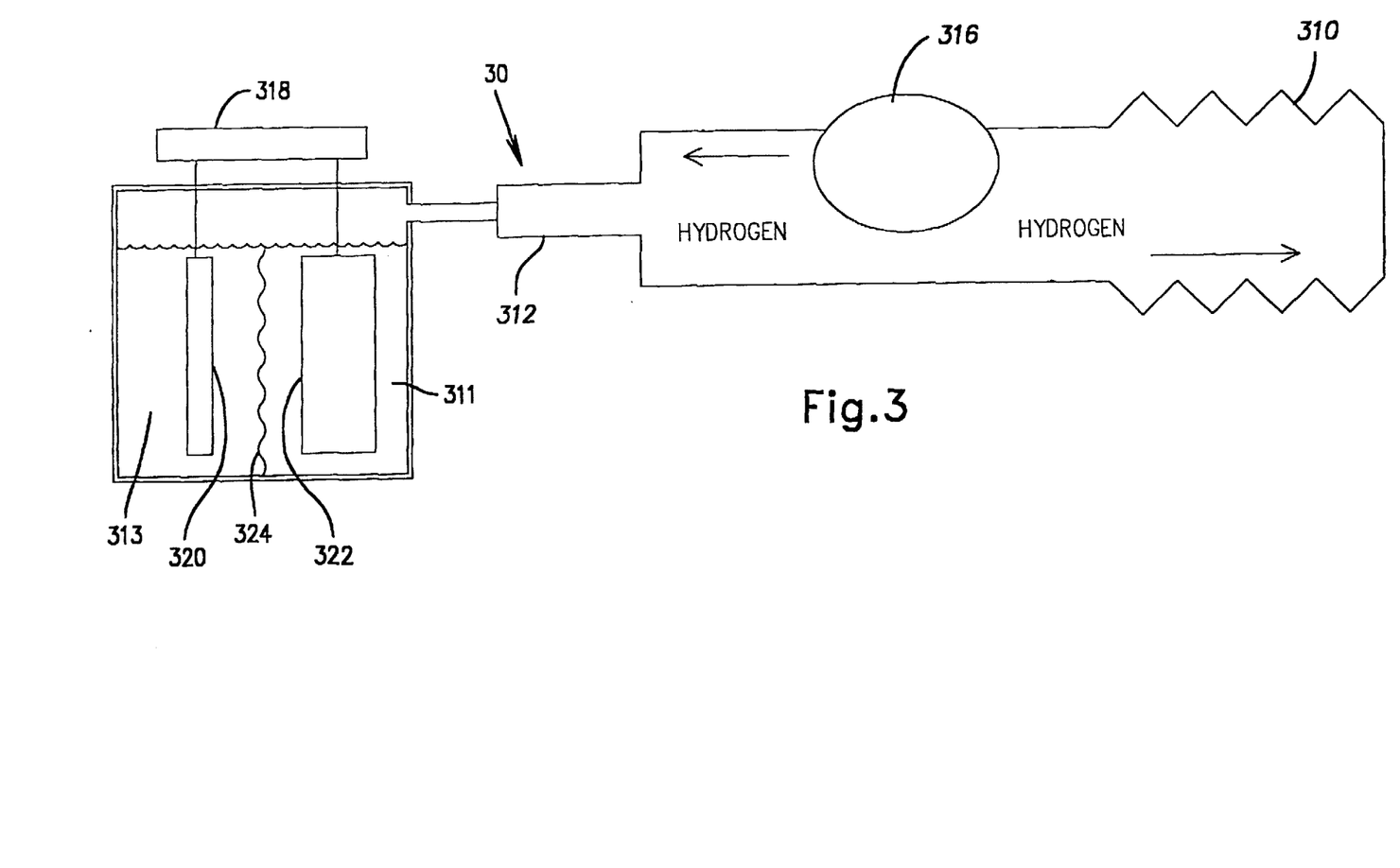
FIG. 3 is a schematic illustration of a bellow-type embodiment of the electrochemical heat exchanger according to the present invention.

A further embodiment of an electrochemical heat exchanger 30 is illustrated in FIG. 3. Similar principles of expansion and contraction are used in the heat exchanger 30 as in heat exchanger 20 discussed above. Specifically, during the charge cycle, hydrogen is produced, and the hydrogen produced can either be used as a coolant or as a source of pressure to force expansion of a flexible material. Similarly, during discharge, hydrogen is consumed, causing contraction of a flexible material. In the heat exchanger 20 discussed above, these principles are used to force water or a similarly effective heat transfer fluid through heat exchange chamber 234 to permit thermal exchange between the element to be cooled and the liquid cooling agent. In the heat exchanger 30 illustrated in FIG. 3, a flexible bellow 310 is provided which is capable of expanding or contracting in response to a pressure differential created by the electrochemical cell 311. Instead of two cells, one functioning as a producer and one as a consumer of hydrogen, only one electrochemical cell 311 is required for this embodiment. The electrochemical cell 311 is in contact with the flexible bellow 310 through a communication pipe 312. The communication pipe 312 provides a surface for an item such as a microchip 316 to be cooled. Expansion and contraction of bellow 310 in response to changes in pressure in electrochemical cell 311 increases the heat transfer coefficient between the hydrogen and the ambient atmosphere. Electrochemical cell 311 includes an electrolyte 313, a separator 324, as well as metal hydride electrode 320 electrically connected to power supply 318 and hydrogen electrode 322 connected to the other end of power supply 318. Alternating the amplitude of the current from the power supply 318 allows the metal hydride-hydrogen cell 311 to alternatively consume or produce hydrogen at different rates. This method of oscillating the pressure inside the heat exchanger 30 may be termed amplitude modulation. Similarly, the frequency with which the polarity of the current from the power supply 318 is adjusted may also be employed to expand and contract the flexible bellow. This may be referred to as frequency modulation.

Figure 4:
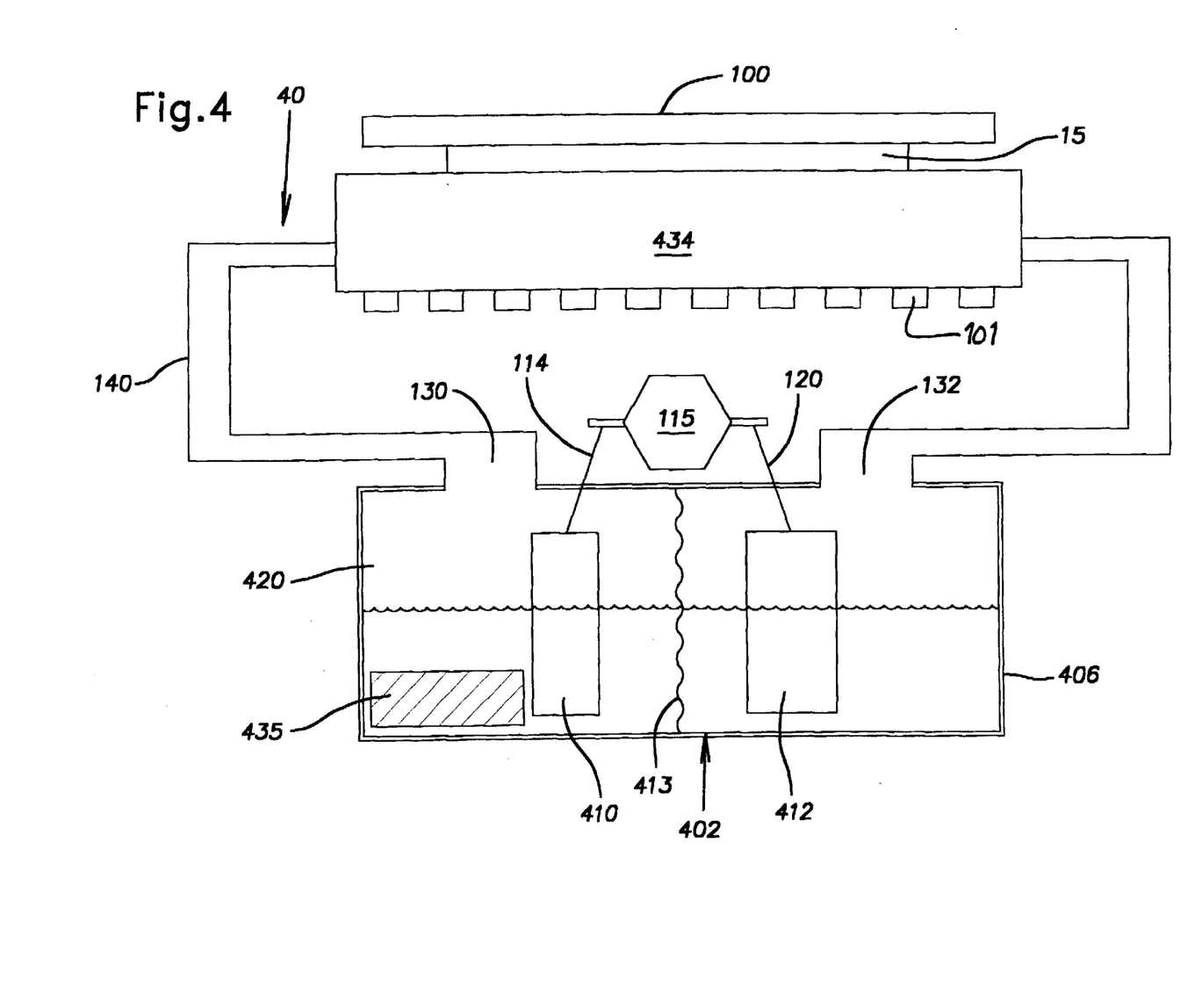
FIG. 4 is a schematic illustration of a hydrogen-hydrogen electrochemical heat exchanger according to the present invention.

It is also possible to use one hydrogen-hydrogen symmetrical cell instead of the metal hydride-hydrogen cell. In this design, one hydrogen electrode would be used to produce hydrogen and the other to consume hydrogen. The separator would divide the hydrogen electrodes as well as the gas spaces. FIG. 4 illustrates an example of an electrochemical heat exchanger 40. The difference between the embodiment shown in FIG. 4 and the preferred embodiment shown in FIG. 1 reside in the electrochemical cell 402. Each of the other elements are the same and for convenience will be identified with the same numeral as in FIG. 1, and will not be discussed in detail. Electrochemical cell 402 includes a single unitary housing 406 which houses a first and second hydrogen electrodes 410, 412. An ion exchange membrane 413 separates the hydrogen electrode 410 and 412. Each of the electrodes 410 and 412 is connected to opposite ends of power supply 115. In this embodiment, typically the electrolyte 420 is an ion exchange membrane. Hydrogen gas produced by first hydrogen electrode 410 is passed through conduit 140 and exchange heat with the element 100 to be cooled via heat exchange chamber 434. The hydrogen gas produced by first hydrogen electrode 410 is consumed by hydrogen electrode 412. A low working surface resulting in a low rate of gas flow is a disadvantage to employing the symmetrical hydrogen-hydrogen cell. Additionally, hydrogen-hydrogen cells suffer from leakage of gas to the environment. Accordingly, metal hydride compensating plate 435 is provided to compensate for hydrogen lost during leakage. Metal hydride compensating plate 435 is able to occlude hydrogen and is designed to occlude or disassociate hydrogen upon a loss of hydrogen below a predetermined level. Although hydrogen leakage generally is minor, without a source of compensation, it can create serious problems. Metal hydride plate 435 can be used as compensating means in electrochemical heat exchanger 40. This is based on the fact that metal-hydride plate 435 maintains the hydrogen pressure within a predetermined range by occluding hydrogen in the event the hydrogen pressure within the heat exchanger 40 falls below a certain pressure value. If hydrogen pressure drops as a result of hydrogen leakage, hydrogen will escape from metal hydride plate 435 and will compensate a loss of hydrogen. The composition of the plate 435 should not be as porous as the metal-hydride electrodes discussed above. The hydrogen capacity of plate 435 should be enough for compensation of hydrogen leakage during the life time of electrochemical heat exchanger 40. Assuming free gas volume of the electrochemical heat exchanger 40 is equal V(m$^3$) and average pressure is equal P(Pa), the total number of hydrogen molecules in the gas space of electrochemical heat exchanger 40 is:

$$n = PV/RT \quad (11)$$

Here: R is molar gas constant is equal 8.31 Jmol$^{-1}$K$^{-1}$, and T is Kelvin temperature. If the electrochemical heat exchanger 40 has a 50% hydrogen loss per year, total hydrogen lost during a five-year cycle life will be 250%, this means that compensated metal hydride plate has to contain al least 0.96875 PV/RT molecules hydrogen. If it is necessary to remove 100 watts heat, the free volume of the electrochemical heat exchanger 40 would be equal 3×10$^{-4}$ m$^3$. By the average pressure value being equal 2×10$^5$ Pa, the number of hydrogen molecules which should be stored in metal hydride plate 435 should be:

$$n = \frac{2 \times 10^5 \times 3 \times 10^{-4}}{8.31 \times 298} = .025 \text{ molsH}_2$$

One mole of metal hydride LanNi$_5$ alloy can be reversible and consume and produce two mol hydrogen. Molecular weight of this alloy is equal to 432 g. That means that we need 432×0.025/2=5.4 g of LanNi$_5$ alloy for compensation of hydrogen leakage during the life time of the electrochemical heat exchanger 40. This compensation can occur through the use of a compensating metal hydride plate 435.

Figure 5:
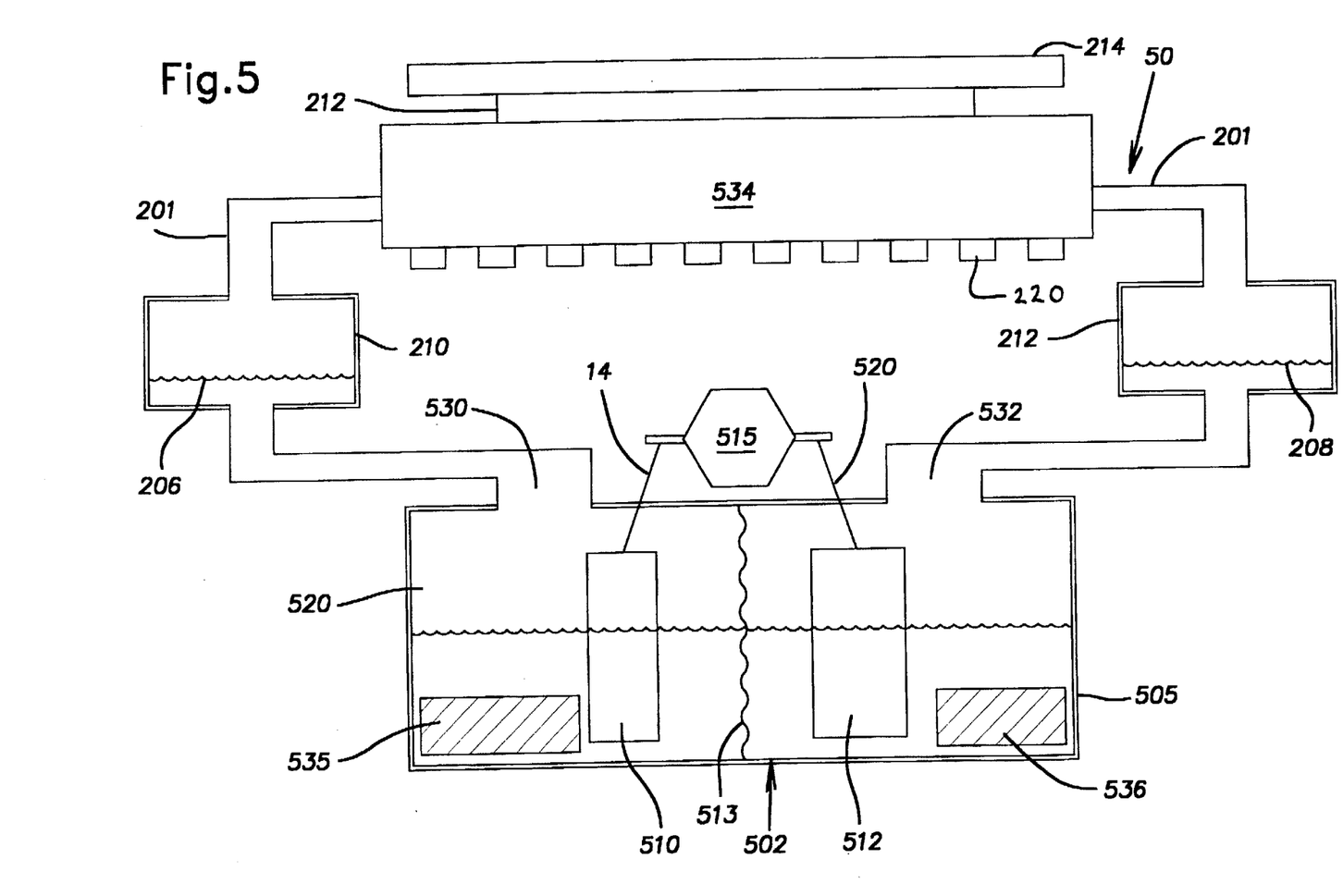
FIG. 5 is a schematic illustration of a hydrogen-hydrogen electrochemical heat exchanger, wherein a fluid filled coolant may be used.
Figure 6:
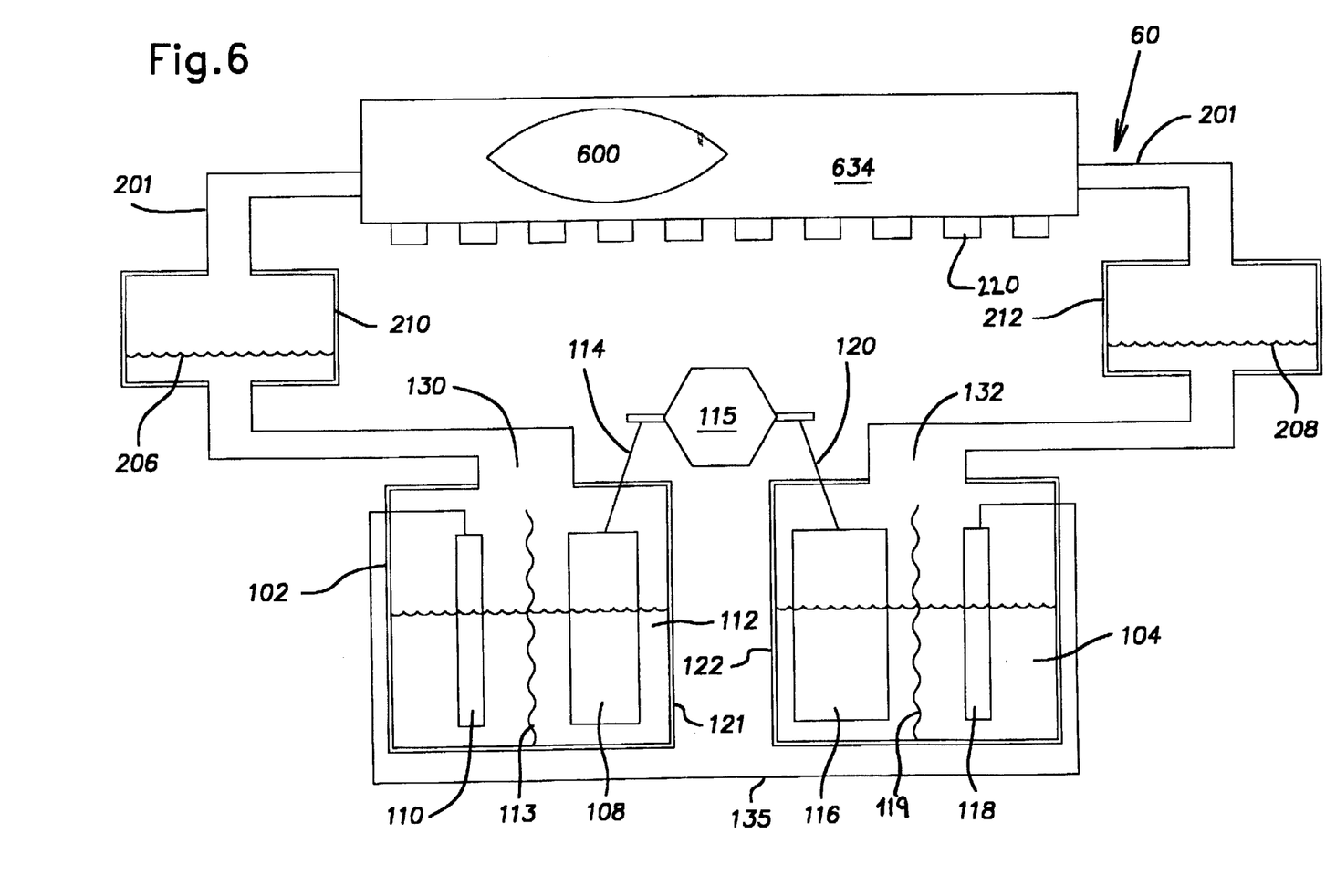
FIG. 6 is a schematic illustration of an electrochemical heat exchanger according to the present invention wherein the element to be cooled is placed inside the heat chamber.

The embodiment of electrochemical heat exchanger 50 illustrated in FIG. 5 is very similar to that described in FIG. 2 except a symmetrical hydrogen-hydrogen system as described with regard to FIG. 4 is utilized. Again, for convenience reference numerals indicating similar elements will remain the same as those used in FIG. 2. Power supply 515 is electrically connected to first hydrogen electrode 510 through lead 514 and to second hydrogen electrode 512 through lead 520 both of which are immersed in electrolyte 520 housed in sealed housing 505. They are separated by an ion exchange membrane 513. Hydrogen gas produced by first hydrogen electrode 510 fills gas space 530 and forces liquid coolant level 206 to push a liquid coolant through heat exchange chamber 534. Hydrogen electrode 512 consumes the hydrogen filling gas space 532 which liquid coolant level 208 to move in response to the coolant moving through heat exchange chamber 534. Again, the hydrogen-hydrogen cell is less preferred because it inherently has a low working surface resulting in a low rate of gas flow which is undesirable because less force is applied to adjust liquid coolant levels 206, 208. Similar to the embodiment illustrated in FIG. 4, heat exchanger 50 includes compensating metal hydride plates 535, 536 to compensate for leakage of hydrogen gas. The metal hydride plates 535, 536 assure that the hydrogen lost to leakage can be replenished. It is necessary to have a metal hydride compensating plate in each cell since they do not share a common gas space.

First, an electrochemical heat exchanger according to the present invention allows controlled production and consumption of hydrogen. Second, a preferred electrochemical heat exchanger according to the present invention features a fully sealed construction. Third, an electrochemical heat exchanger according to the present invention offers an indication of the onset of overcharging thereby facilitating the prevention of overcharging and indicating the necessity of a switch in polarity. Fourth, an electrochemical heat exchanger according to the present invention avoids the need for a substantial number of mechanical parts. Fifth, an electrochemical according to the present invention is capable of cooling electronic components without relying on phase transfer.

While the invention has been described with respect to preferred embodiments, it will be appreciated that many variations, modifications and other applications of the invention may be made which are within the scope of the presently disclosed invention.

What is claimed is:

1. An electrochemical heat exchanger comprising:

a housing;

a first hydrogen electrode contained in said housing and having a first gas space;

a second hydrogen electrode contained in said housing having a second gas space, said second hydrogen being separated from said first hydrogen electrode by a solid electrolyte, said electrolyte electrically connecting said first and second hydrogen electrodes;

at least one compensating metal hydride plate having a common gas space with said first hydrogen electrode; and a heat exchanger chamber disposed between said first and second hydrogen electrodes, said first and second gas space being in communication through said heat exchange chamber.

2. An electrochemical heat exchanger as in claim 1, wherein the first hydrogen electrode is electrically connected to a pole of a power supply, and the second hydrogen electrode is connected to a second pole of said power supply.

3. An electrochemical heat exchanger as in claim 1, wherein said first and second hydrogen electrodes share a common gas space with the heat exchange chamber.

4. An electrochemical heat exchanger as in claim 1, wherein said chamber is at least partially filled with a liquid.

5. An electrochemical heat exchanger as in claim 1, wherein said chamber is at least partially filled with a gas.

6. An electrochemical heat exchanger according to claim 4, wherein a second metal hydride compensating plate shares a common gas space with said second hydrogen electrode.

* * * * *